(12) United States Patent
Yoshimoto et al.

(10) Patent No.: US 9,910,709 B2
(45) Date of Patent: Mar. 6, 2018

(54) ALLOCATION CONTROL METHOD AND APPARATUS

(71) Applicant: FUJITSU LIMITED, Kawasaki-shi, Kanagawa (JP)

(72) Inventors: Yasuo Yoshimoto, Numazu (JP); Hiroki Sumida, Numazu (JP); Akira Kureha, Yokohama (JP); Ichiro Yamada, Yokohama (JP); Yoshiko Yamasaki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/636,551

(22) Filed: Mar. 3, 2015

(65) Prior Publication Data

US 2015/0269002 A1    Sep. 24, 2015

(30) Foreign Application Priority Data

Mar. 20, 2014   (JP) ................. 2014-059136

(51) Int. Cl.
  *G06F 9/46*   (2006.01)
  *G06F 9/50*   (2006.01)
  *G06F 9/455*   (2018.01)

(52) U.S. Cl.
  CPC ........ *G06F 9/5038* (2013.01); *G06F 9/45558* (2013.01); *G06F 2009/4557* (2013.01)

(58) Field of Classification Search
  CPC .. G06F 9/4881; G06F 9/5038; G06F 9/45558; G06F 2009/4557; C06F 9/4887
  See application file for complete search history.

(56) References Cited

U.S. PATENT DOCUMENTS

| | | | |
|---|---|---|---|
| 7,203,944 B1 * | 4/2007 | van Rietschote ... | G06F 9/45533 718/1 |
| 8,627,315 B2 * | 1/2014 | Li ....................... | G06F 9/45533 709/224 |
| 8,813,240 B1 * | 8/2014 | Northup ................ | G06F 21/554 726/22 |

(Continued)

FOREIGN PATENT DOCUMENTS

| JP | 2006-508445 | 3/2006 |
|---|---|---|
| JP | 2009-151745 | 7/2009 |

(Continued)

OTHER PUBLICATIONS

Office Action of Japanese Patent Application No. 2014-059136 dated Oct. 31, 2017 (with machine generated English translation).

*Primary Examiner* — Camquy Truong
(74) *Attorney, Agent, or Firm* — Oblon, McClelland, Maier & Neustadt, L.L.P.

(57) ABSTRACT

An allocation control method includes: determining, for each of plural virtual machines executed on a first information processing apparatus or a second information processing apparatus, whether the virtual machine is executing a first processing that is performed in response to a request from an external apparatus; first allocating, to the first information processing apparatus, first virtual machines, which are executing the first processing, among the plural virtual machines; and second allocating, to the second information processing apparatus, second virtual machines, which are not executing the first processing, among the plural virtual machines.

9 Claims, 26 Drawing Sheets

(56) References Cited

U.S. PATENT DOCUMENTS

| | | | |
|---|---|---|---|
| 2004/0107273 A1 | 6/2004 | Biran et al. | |
| 2008/0163239 A1* | 7/2008 | Sugumar | G06F 9/5088 718/105 |
| 2008/0295096 A1* | 11/2008 | Beaty | G06F 9/4856 718/1 |
| 2009/0138887 A1 | 5/2009 | Uehara et al. | |
| 2011/0099403 A1 | 4/2011 | Miyata et al. | |
| 2012/0331147 A1* | 12/2012 | Dutta | G06F 9/06 709/226 |
| 2014/0032761 A1* | 1/2014 | Beveridge | G06F 9/5011 709/226 |

FOREIGN PATENT DOCUMENTS

| | | |
|---|---|---|
| JP | 2010-61278 | 3/2010 |
| JP | 2011-90594 | 5/2011 |
| JP | 2013-242797 | 12/2013 |
| WO | 2012053115 A1 | 4/2012 |

\* cited by examiner

| DATE AND TIME | VM NAME | CPU UTILIZATION | AMOUNT OF I/O DATA | DATA TRAFFIC |
|---|---|---|---|---|
| ⋮ | ⋮ | ⋮ | ⋮ | ⋮ |
| 2013/10/3 13:29 | Web1, | 20%, | 10kB/s, | 100kB/s |
| 2013/10/3 13:29 | Web2, | 30%, | 300kB/s, | 50kB/s |
| 2013/10/3 13:29 | Web3, | 0%, | 5kB/s, | 1kB/s |
| 2013/10/3 13:29 | IDLE01, | 4%, | 20kB/s, | 5kB/s |
| ⋮ | ⋮ | ⋮ | ⋮ | ⋮ |
| 2013/10/3 13:30 | Web1, | 20%, | 15kB/s, | 100kB/s |
| 2013/10/3 13:30 | Web2, | 30%, | 200kB/s, | 30kB/s |
| 2013/10/3 13:30 | Web3, | 0% | 5kB/s, | 1kB/s |
| 2013/10/3 13:30 | IDLE01, | 4%, | 20kB/s, | 5kB/s |
| ⋮ | ⋮ | ⋮ | ⋮ | ⋮ |

| THRESHOLD | CPU UTILIZATION | AMOUNT OF I/O DATA | DATA TRAFFIC |
|---|---|---|---|
| IDLE VM FOR DETECTION | 5% | 20kB/s | 100kB/s |

| VM NAME | IDLE TIME |
|---|---|
| Web1 | 1080 MINUTES |
| Web2 | 940 MINUTES |
| Web3 | 1440 MINUTES |
| Web4 | 1050 MINUTES |
| ⋮ | ⋮ |

FIG.10

| DATE AND TIME | VM NAME | SERVER | STATE |
|---|---|---|---|
| 2013/9/29 8:00 | Web1 | B01 | Work |
| 2013/9/29 8:00 | Web2 | B01 | Idle |
| 2013/9/29 8:00 | Web3 | B02 | Idle |
| 2013/9/29 8:00 | Web4 | B02 | Work |
| 2013/9/29 8:00 | Web5 | B03 | Idle |
| 2013/9/29 8:00 | Web6 | B03 | Idle |
| ⋮ | ⋮ | ⋮ | ⋮ |
| 2013/9/30 8:00 | Web1 | B01 | Work |
| 2013/9/30 8:00 | Web2 | B01 | Idle |
| 2013/9/30 8:00 | Web3 | B02 | Work |
| 2013/9/30 8:00 | Web4 | B02 | Idle |
| 2013/9/30 8:00 | Web5 | B03 | Idle |
| 2013/9/30 8:00 | Web6 | B03 | Idle |
| ⋮ | ⋮ | ⋮ | ⋮ |
| 2013/10/1 8:00 | Web1 | B01 | Idle |
| 2013/10/1 8:00 | Web2 | B01 | Work |
| 2013/10/1 8:00 | Web3 | B02 | Idle |
| 2013/10/1 8:00 | Web4 | B02 | Idle |
| 2013/10/1 8:00 | Web5 | B03 | Work |
| 2013/10/1 8:00 | Web6 | B03 | Idle |
| ⋮ | ⋮ | ⋮ | ⋮ |

FIG.11

| VM NAME | SERVER | 9/29 | 9/30 | 10/1 | 10/2 |
|---|---|---|---|---|---|
| Web1 | B01 | Work | Work | Idle | Idle |
| Web2 | B01 | Idle | Idle | Work | Work |
| Web3 | B02 | Idle | Work | Idle | Work |
| Web4 | B02 | Work | Idle | Idle | Idle |
| Web5 | B03 | Idle | Idle | Work | Idle |
| Web6 | B03 | Idle | Idle | Idle | Work |

FIG.13

| ITEM | 9/29 | 9/30 | 10/1 | 10/2 |
|---|---|---|---|---|
| IDLE STATE FOR 1 DAY | 4 | 1 | 2 | 1 |
| IDLE STATE FOR 2 DAYS | 0 | 3 | 1 | 1 |
| IDLE STATE FOR OVER 2 DAYS | 0 | 3 | 2 | 2 |
| NUMBER OF WORK VMs | 0 | 0 | 2 | 1 |

FIG.14

| n | MAXIMUM NUMBER |
|---|---|
| 1 | 10 |
| 2 | 8 |
| 3 | 7 |
| ⋮ | ⋮ |
| $n_{max}$ | 4 |

FIG.16

```
idle_days = 2  'COLLECT VM WHICH HAS BEEN IDLE FOR 2 DAYS IN SERVER FOR IDLE VMs
For x = 3 To 8
    idle_cnt = 0
    For y = 4 To 7
        'NUMBER OF VMs WHICH HAVE BEEN IDLE FOR n DAYS
        If Cells(x, y) = "Idle" Then idle_cnt = idle_cnt + 1 Else idle_cnt = 0
        If idle_cnt > 0 And idle_cnt <= idle_days Then Cells(idle_cnt + 2, y + 9) = Cells(idle_cnt + 2, y + 9) + 1

'NUMBER OF VMs WHICH HAVE BEEN IDLE FOR OVER n DAYS
        If idle_cnt >= idle_days Then Cells(idle_days + 3, y + 9) = Cells(idle_days + 3, y + 9) + 1

'NUMBER OF WORK VMs (IDLE VM CHANGES INTO WORK VM IF NEXT DAY CORRESPONDS TO "WORK".
        INCREMENT NUMBER OF WORK VMs BY 1 AT DATE IN WHICH IDLE VM BECOMES WORK VM)
        If y <= (7 - 1) And idle_cnt >= idle_days And Cells(x, y + 1) = "Work" Then
            Cells(idle_days + 4, y + (9 + 1)) = Cells(idle_days + 4, y + (9 + 1)) + 1
    Next y
Next x
```

FIG.15

```
Write-Host "IdleVM Controller start."
Move-VM  Web1 -destination G01
Move-VM  Web6 -destination B03
Write-Host "IdleVM Controller end. Idle=1, Work=1"
```

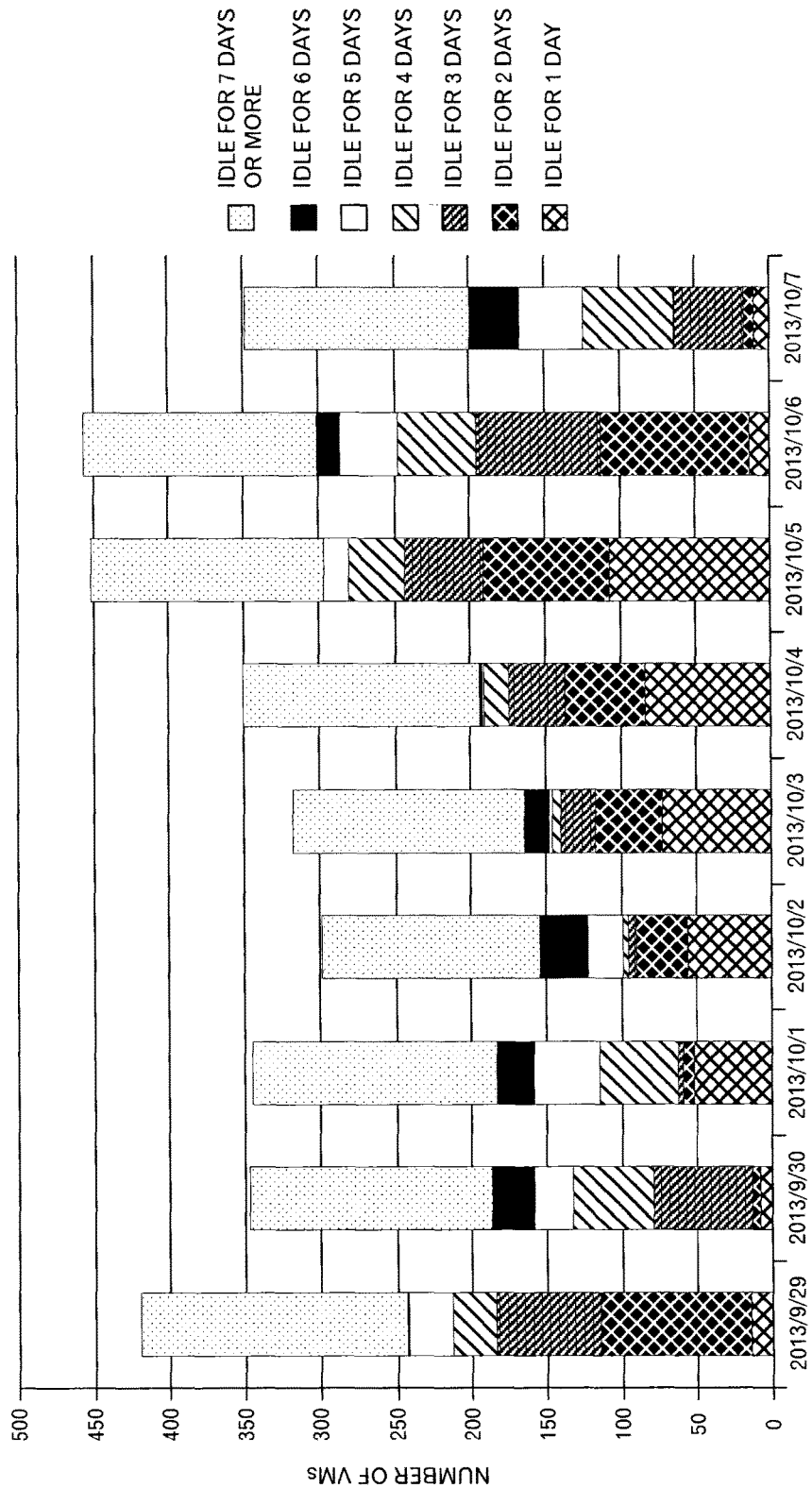

| SERVER | AVAILABLE MEMORY CAPACITY |
|--------|---------------------------|
| B01    | 20GB                      |
| B02    | 15GB                      |
| B03    | 22GB                      |

| SERVER | AVAILABLE MEMORY CAPACITY |
|--------|---------------------------|
| B01    | 20GB                      |
| B02    | 15GB                      |
| B03    | 18GB                      |

FIG.31

NEW TRIGGER  ✕

TASK INITIATION (G): KEEP SCHEDULE ▼

SETTING ─────────────────────────── 3001

○ ONCE (N)   START (S): 2013/11/27 ▼   13:00:00 ◆   ☐ SYNCHRONIZE OVER TIME ZONE (Z)
● EVERY DAY (D)
○ EVERY WEEK (W)   INTERVAL (C): 1   DAY
○ EVERY MONTH (M)

ADVANCED SETTING ─────────────────── 3002

☐ DESIGNATE DELAY TIME (RANDOM) (K): 1 HOUR ▼   DURATION (F): FOR 1 DAY ▼

☐ REPETITION INTERVAL (P): 1 HOUR ▼

☐ STOP ALL TASKS IN EXECUTION AT END OF REPETITION DURATION (I)

☐ TIME BEFORE STOP (L): 3 DAYS ▼

☐ EXPIRE DATE AND TIME (X): 2014/11/27 ▼   10:52:34 ◆   ☐ SYNCHRONIZE OVER TIME ZONE (E)

☑ VALID (B)                                                    OK    CANCEL
                                                         3003

| | WITHOUT IDLE VM | WITH IDLE VM |
|---|---|---|
| ALLOCATED MEMORY AMOUNT | 2GB*12=24GB | 2GB*32=64GB |
| NUMBER OF WORK VMs | 12 | 12 |
| NUMBER OF IDLE VMs | NONE | 20 |
| NUMBER OF TERMINALS | 600 TERMINALS | 600 TERMINALS |
| THROUGHPUT | 669 SCREENS/s | 651 SCREENS/s |
| AVERAGE RESPONSE TIME | 314ms | 480ms |
| CPU UTILIZATION | 82% | 83% |

ALLOCATION CONTROL METHOD AND APPARATUS

CROSS-REFERENCE TO RELATED APPLICATIONS

This application is based upon and claims the benefit of priority of the prior Japanese Patent Application No. 2014-059136, filed on Mar. 20, 2014, the entire contents of which are incorporated herein by reference.

FIELD

This invention relates to a technique for allocating a virtual machine.

BACKGROUND

A proportion of electricity charges to an operational cost of a data center is large. According to a certain survey, the proportion of electricity charges to the operational cost of the data center is approximately 32.4%, although a proportion of electricity charges to a production cost of a large manufacturer is approximately 3%. Therefore, a company that manages the data center makes various efforts to reduce electricity consumption in the data center.

For example, a certain document focuses on a fact that resources of a physical server in the data center are not effectively used and electricity consumption becomes high as a result. Specifically, it is proposed to reallocate, based on a usage rate of the resources of the physical server, the resources to be allocated to virtual machines in order to reduce resources which are not used and reduce electricity consumption in a whole system.

Patent Document 1: Japanese Laid-open Patent Publication No. 2010-61278

However, even though the technique described above is used, there's a case where the resources of the physical server are not effectively used and a reduction of electricity consumption is not enough.

SUMMARY

An allocation control method relating to one aspect of this embodiment includes: determining, for each of plural virtual machines executed on a first information processing apparatus or a second information processing apparatus, whether the virtual machine is executing a first processing that is performed in response to a request from an external apparatus; first allocating, to the first information processing apparatus, first virtual machines, which are executing the first processing, among the plural virtual machines; and second allocating, to the second information processing apparatus, second virtual machines, which are not executing the first processing, among the plural virtual machines.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 10 is a diagram depicting an example of a data format;

FIG. 11 is a diagram depicting an example of a state log stored in a state log storage unit;

FIG. 13 is a diagram depicting an example of time-series data stored in a time-series data storage unit;

FIG. 14 is a diagram depicting an example of data concerning the number of VMs, which is stored in a first VM data storage unit;

FIG. 15 is a diagram depicting an example of a program to generate the data concerning the number of VMs;

FIG. 16 is a diagram depicting an example of data concerning a maximum number of VMs, which is stored in a second VM data storage unit;

FIG. 26 is a diagram depicting changes in the number of idle VMs in a data center;

FIG. 31 is a diagram depicting a window to perform setting;

DESCRIPTION OF EMBODIMENTS

Figure 1:
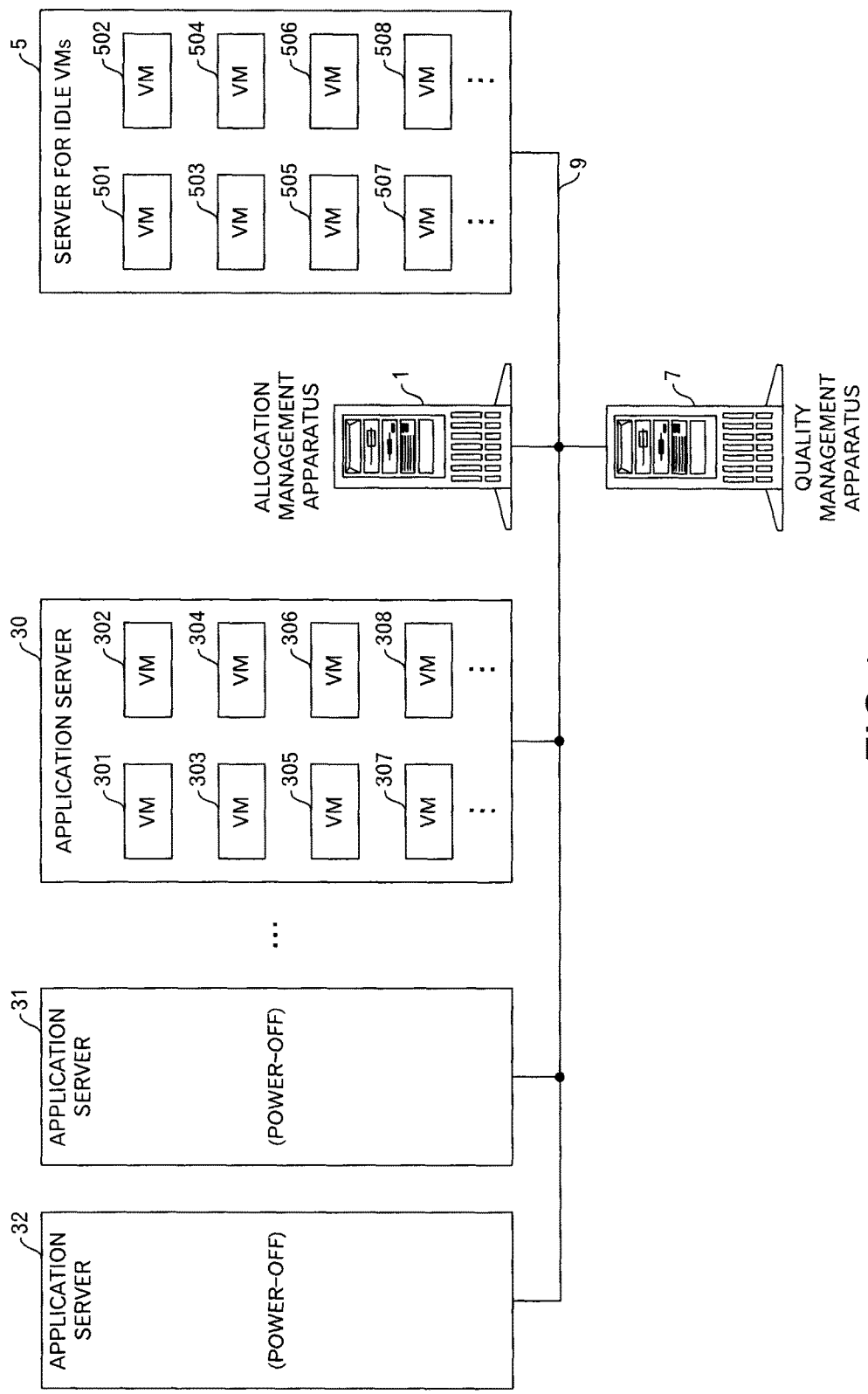
FIG. 1 is a diagram depicting a system outline of this embodiment.

FIG. 1 illustrates a system outline of this embodiment. Application servers 30 to 32 that are physical servers, a server 5 for idle VMs (Virtual Machines), which is a physical server, an allocation management apparatus 1 that performs a main processing in this embodiment, and a quality management apparatus 7 are connected to a network 9 that is, for example, a LAN (Local Area Network). In the following, a VM that is in an idle state is called an idle VM, and a VM that is executing transaction to provide a service is called an operating VM. The transaction is, for example, executed in response to a request from an external terminal or the like (not illustrated). A VM which is in the idle state executes an OS (Operating System), but it does not execute the processing to provide the service.

The application servers 30 to 32 are servers to execute the operating VMs. The allocation management apparatus 1 migrates an idle VM, which has been in the idle state for a predetermined time or longer in the application server 30, from the application server 30 to the server 5 for idle VMs.

Application servers that do not execute a VM (in the example of FIG. 1, the application servers 31 and 32) are powered off. By using FIG. 2, a method to reduce electricity consumption by collecting up VMs is explained. In this embodiment, the electricity consumption is reduced by decreasing the number of application servers which are powered on. In an example of FIG. 2, the application server 32 is powered off because it does not execute any VM, and the application servers 30 and 31 are powered on because they execute a VM. For example, VMs on the application server 31 are migrated to the application server 30 when CPU (Central Processing Unit) utilization of the application server 30 does not reach a predetermined reference value. The application server 32 is powered on when it is impossible to execute all VMs to be executed in the application servers 30 and 31.

The server 5 for idle VMs is a server to execute idle VMs. When a VM started to work in the server 5 for idle VMs (in other words, an operating VM is detected), the allocation management apparatus 1 migrates the VM from the server 5 for idle VMs to the application server 30. Because it is assumed that the server 5 for idle VMs does not execute the transaction, computing performance of the server 5 for idle VMs may be lower than that of the application servers 30 to 32.

The quality management apparatus 7 is a server that collects performance data from the application servers 30 to 32 and the server 5 for idle VMs. The performance data includes date and time, a VM name, CPU utilization, an amount of I/O (Input/Output) data, and data traffic in a network or the like.

Figure 3:
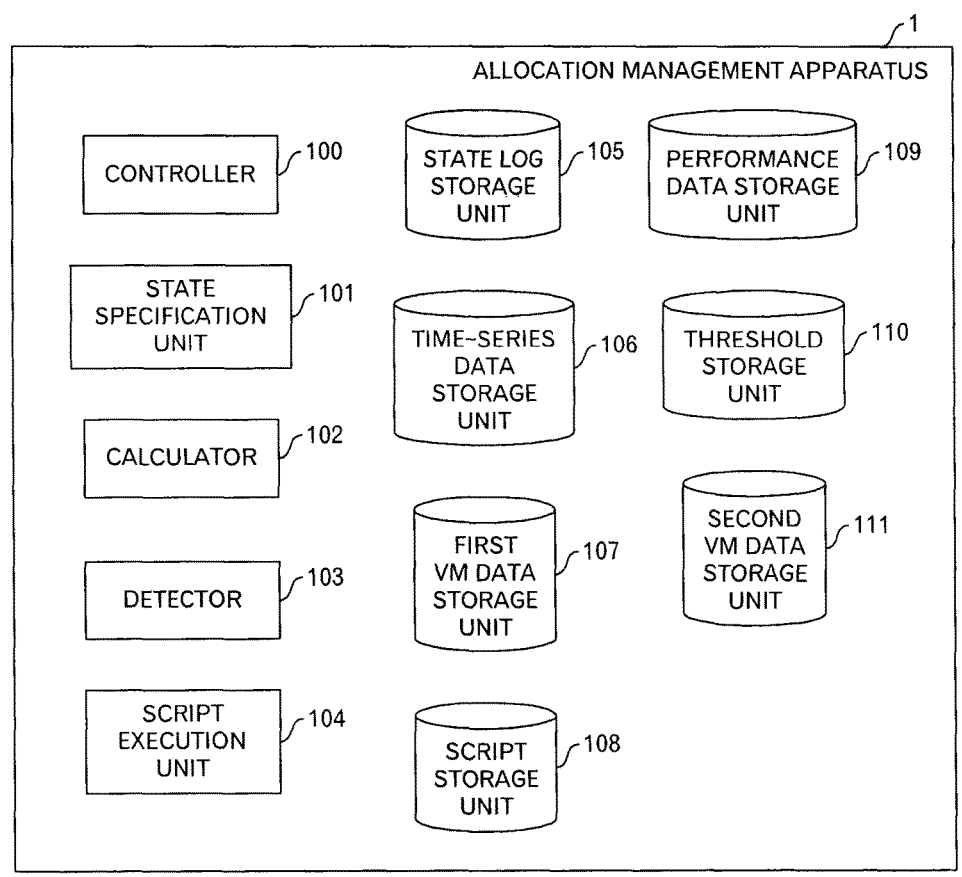
FIG. 3 is a functional block diagram of an allocation management apparatus.

FIG. 3 illustrates a functional block diagram of the allocation management apparatus 1. The allocation management apparatus 1 includes a controller 100, a state specification unit 101, a calculator 102, a detector 103, a script execution unit 104, a state log storage unit 105, a time-series data storage unit 106, a first VM data storage unit 107, a script storage unit 108, a performance data storage unit 109, a threshold storage unit 110, and a second VM data storage unit 111.

The controller 100 controls execution of a processing by the allocation management apparatus 1. The state specification unit 101 uses data stored in the performance data storage unit 109 and data stored in the threshold storage unit 110 to perform a processing, and stores a result of the processing in the state log storage unit 105. The calculator 102 uses data stored in the state log storage unit 105 to perform a processing, and stores a result of the processing in the time-series data storage unit 106. Moreover, the calculator 102 uses data stored in the time-series data storage unit 106 to perform a processing, and stores a result of the processing in the first VM data storage unit 107. Moreover, the calculator 102 uses data stored in the first VM data storage unit 107 to perform a processing, and stores a result of the processing in the second VM data storage unit 111. The detector 103 uses data stored in the time-series data storage unit 106 and data stored in the second VM data storage unit 111 to perform a processing, and stores a result of the processing in the script storage unit 108. The script execution unit 104 executes a script stored in the script storage unit 108.

Figures 2, 4:
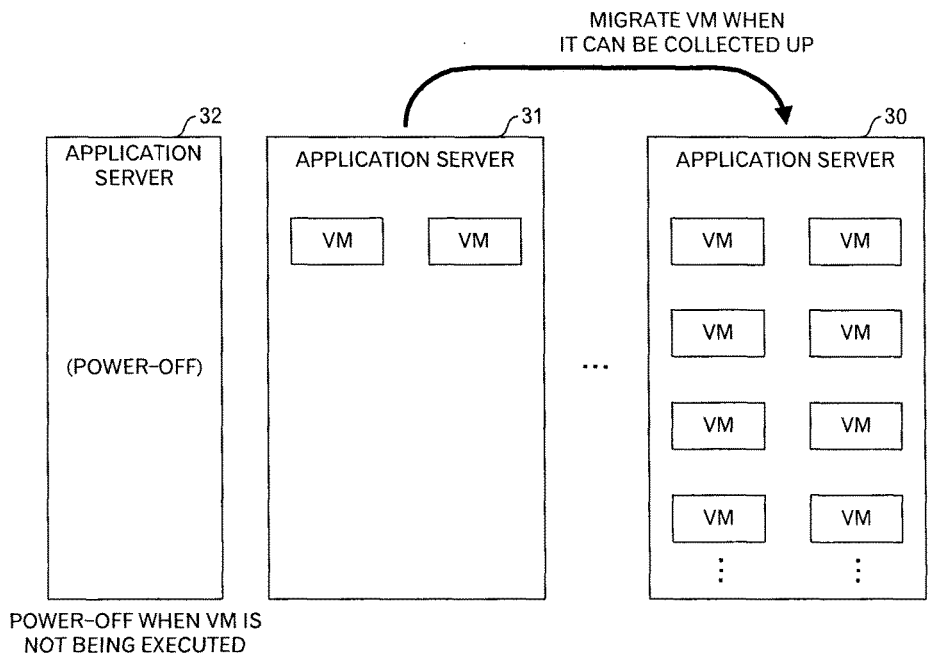
FIG. 2 is a diagram to explain migration of a VM.
FIG. 4 is a diagram depicting an example of data stored in a performance data storage unit.

FIG. 4 illustrates an example of data stored in the performance data storage unit 109. In an example of FIG. 4, date and time, a VM name, CPU utilization, an amount of I/O data, and data traffic in a network are stored. Performance data of the application servers 30 to 32 and the server 5 for idle VMs is collected, for example, every minute by the quality management apparatus 7, and is stored in the performance data storage unit 109 of the allocation management apparatus 1.

In this embodiment, a VM, which is invariably in an idle state and never performs the transaction, (hereinafter referred to a VM for detection) is deployed to the server 5 for idle VMs separately from VMs for providing the service. The VM for detection is a VM which is used when detecting an idle VM.

Figure 5:
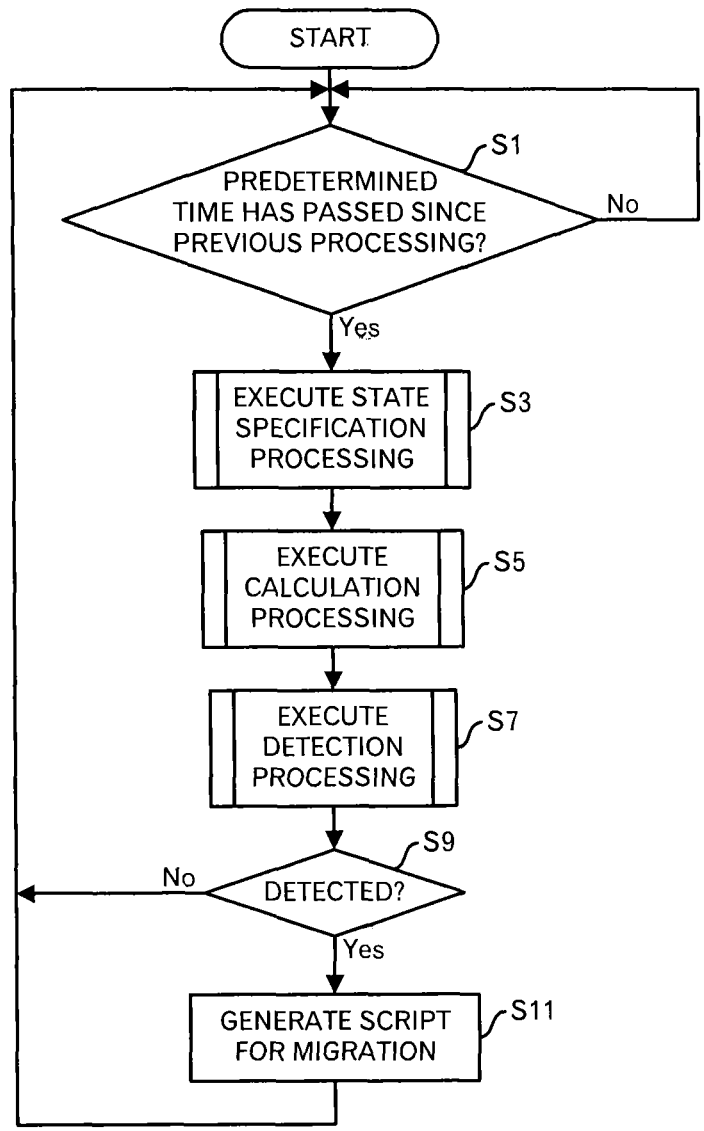
FIG. 5 is a diagram depicting a main processing flow.

Next, by using FIGS. 5 to 31, a processing executed by the allocation management apparatus 1 is explained. First, the controller 100 determines whether a predetermined time (for example, 24 hours) has passed since a previous processing (FIG. 5: step S1).

When it is determined that the predetermined time has not passed (step S1: No route), the processing returns to the processing of the step S1. On the other hand, when it is determined that the predetermined time has passed (step S1: Yes route), the controller 100 outputs a request for execution of a processing to the state specification unit 101.

In response to this, the state specification unit 101 executes a state specification processing (step S3). The state specification processing is explained by using FIGS. 6 to 11.

Figures 6, 7:
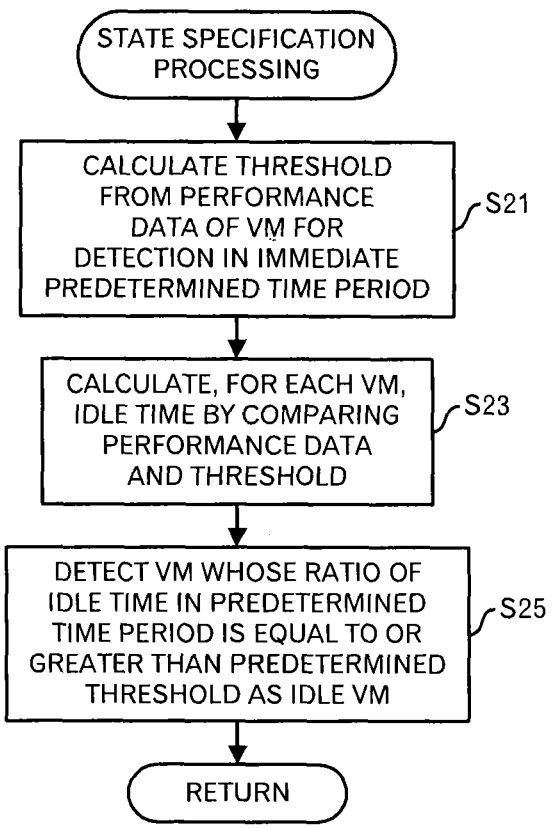
FIG. 6 is a diagram depicting a processing flow of a state specification processing.
FIG. 7 is a diagram depicting an example of data stored in a threshold storage unit.

First, the state specification unit 101 reads out performance data of the VM for detection in an immediate predetermined time period (for example, 24 hours) from the performance data storage unit 109. The performance data of the VM for detection is, for example, performance data whose VM name is "IDLE01" in FIG. 4. Then, the state specification unit 101 calculates a threshold to detect an idle VM from the performance data of the VM for detection in the immediate predetermined time period, and stores the threshold in the threshold storage unit 110 (FIG. 6: step S21). The threshold is, for example, an average value of the performance data in the immediate predetermined time period.

FIG. 7 illustrates an example of data stored in the threshold storage unit 110. In an example of FIG. 7, a threshold for CPU utilization, a threshold for an amount of I/O data, and a threshold for data traffic in a network are stored in the threshold storage unit 110.

The state specification unit 101 compares performance data of each VM executed in the system in the immediate predetermined time period with thresholds stored in the threshold storage unit 110 to calculate an idle time for each VM in the immediate predetermined time period (step S23).

Figure 8:
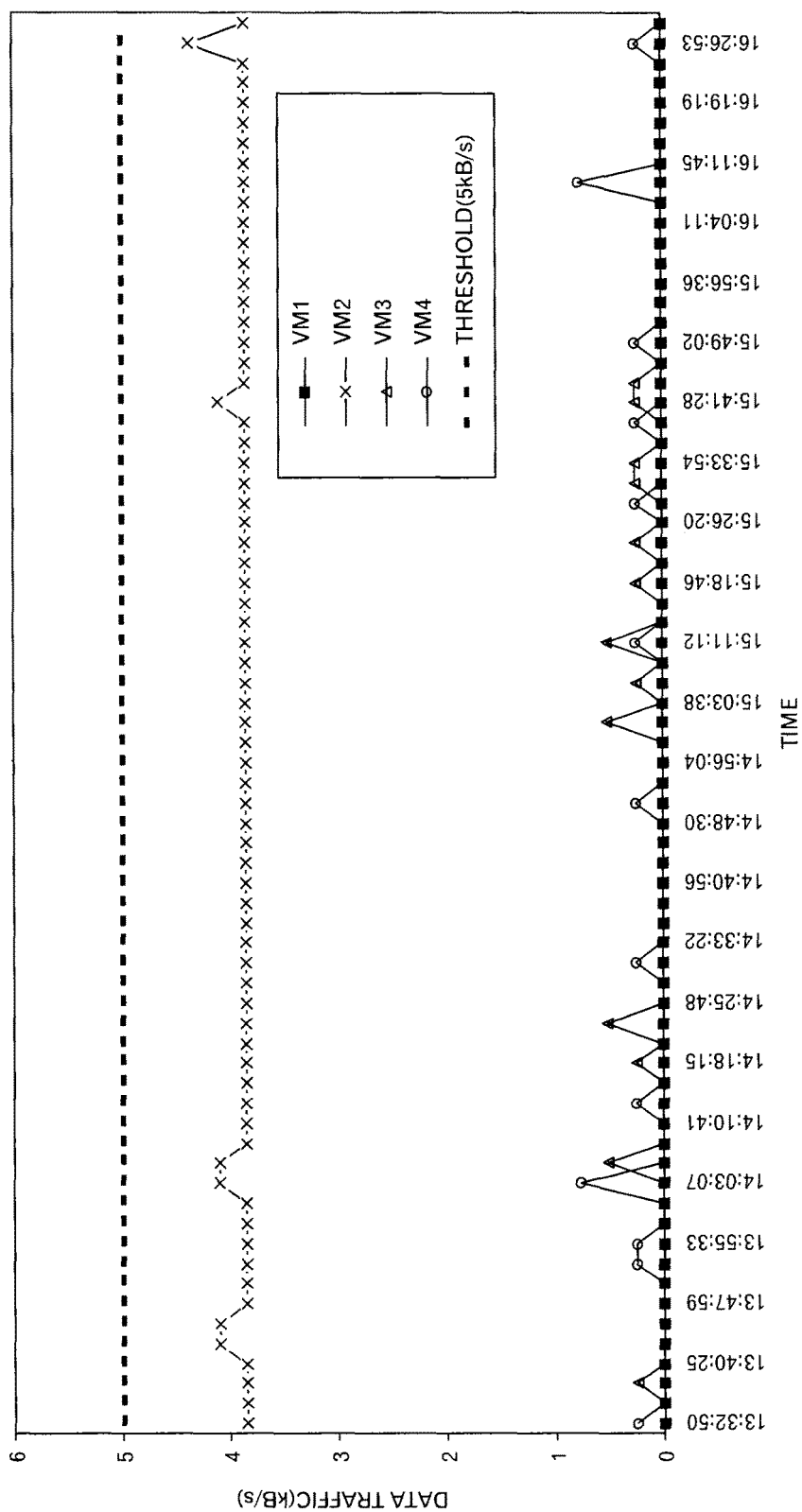
FIG. 8 is a diagram depicting an example of changes in data traffic in a network.
Figure 9:
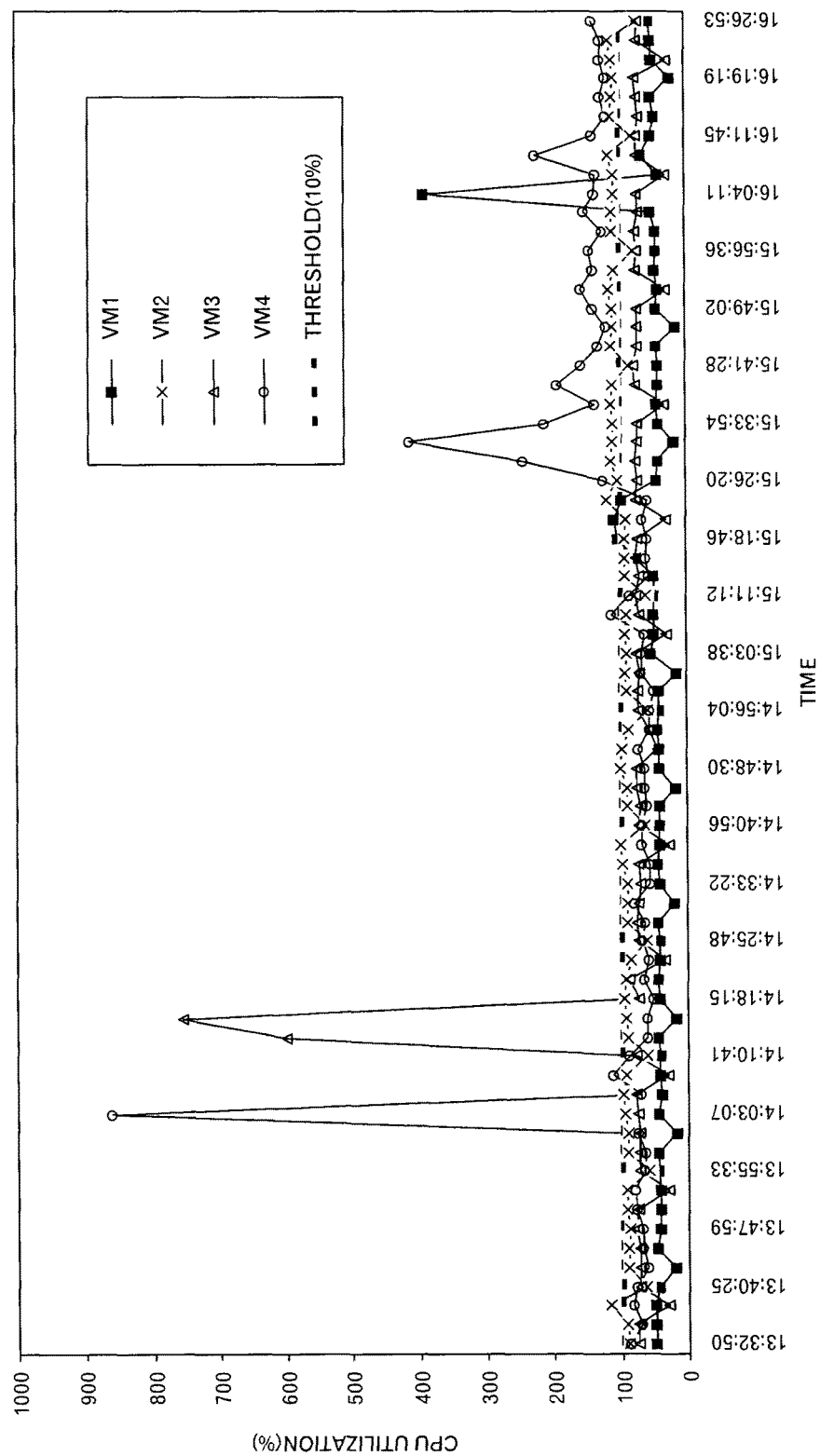
FIG. 9 is diagram depicting an example of changes in CPU utilization.

By using FIGS. 8 and 9, a comparison of the performance data of each VM with the thresholds is explained. FIG. 8 illustrates an example of changes in data traffic in a network. In FIG. 8, a vertical axis represents data traffic (kB/s), and a horizontal axis represents time. A broken line represents a threshold, and the threshold is 5 kB/s. In an example of FIG. 8, data traffic from VM1 to VM4 is less than the threshold in an entire time period.

FIG. 9 illustrates an example of changes in CPU utilization. In FIG. 9, a vertical axis represents CPU utilization (%), and a horizontal axis represents time. A broken line represents a threshold, and the threshold is 10%. In an example of FIG. 9, although CPU utilization of VM1 and VM3 is less than 10% in almost the entire time period, CPU utilization of VM2 and VM4 often exceeds 10% especially in the latter part of the time period.

In this embodiment, for example, a state of a VM is regarded as the idle state at a time when performance data is less than the threshold for any of the items. Therefore, in the examples illustrated in FIGS. 8 and 9, it is determined that VM2 and VM4 are not in the idle state during the latter part of the time period.

An idle time calculated at the step S23 is stored in a storage device such as a main memory or the like, for example, in a format illustrated in FIG. 10. In an example of FIG. 10, a VM name and an idle time are included.

Then, the state specification unit 101 detects a VM whose ratio of the idle time to the immediate predetermined time period is equal to or greater than a threshold (for example, 0.9) (step S25). Then, the processing returns to the calling-source processing. A VM whose ratio of the idle time is equal to or greater than, for example, 0.9 is determined to be in the idle state. This is because it is possible to prevent a temporary processing (for example, a virus scan) from influencing the determination of the state. Incidentally, a VM which is in the idle state may not be detected at the step S25.

The state specification unit 101 stores a result of the processing at the step S25 in the state log storage unit 105. FIG. 11 illustrates an example of a state log stored in the state log storage unit 105. In an example of FIG. 11, date and time, a VM name, identification information of a server, and information that represents a state are stored in the state log storage unit 105. "Work" represents that a VM is working, and "Idle" represents that a VM is in the idle state. A VM, which was detected at the step S25, is set as "Idle". And a VM, which was not detected at the step S25, is set as "Work".

As described above, it is possible to determine whether or not a VM is in an idle state with high precision because performance data of the VM for detection, which does not execute the transaction, is used.

Returning to the explanation of FIG. 5, the controller 100 outputs a request for execution of a calculation processing to the calculator 102. Accordingly, the calculator 102 executes the calculation processing (step S5). The calculation processing is explained by using FIGS. 12 to 24.

Figure 12:
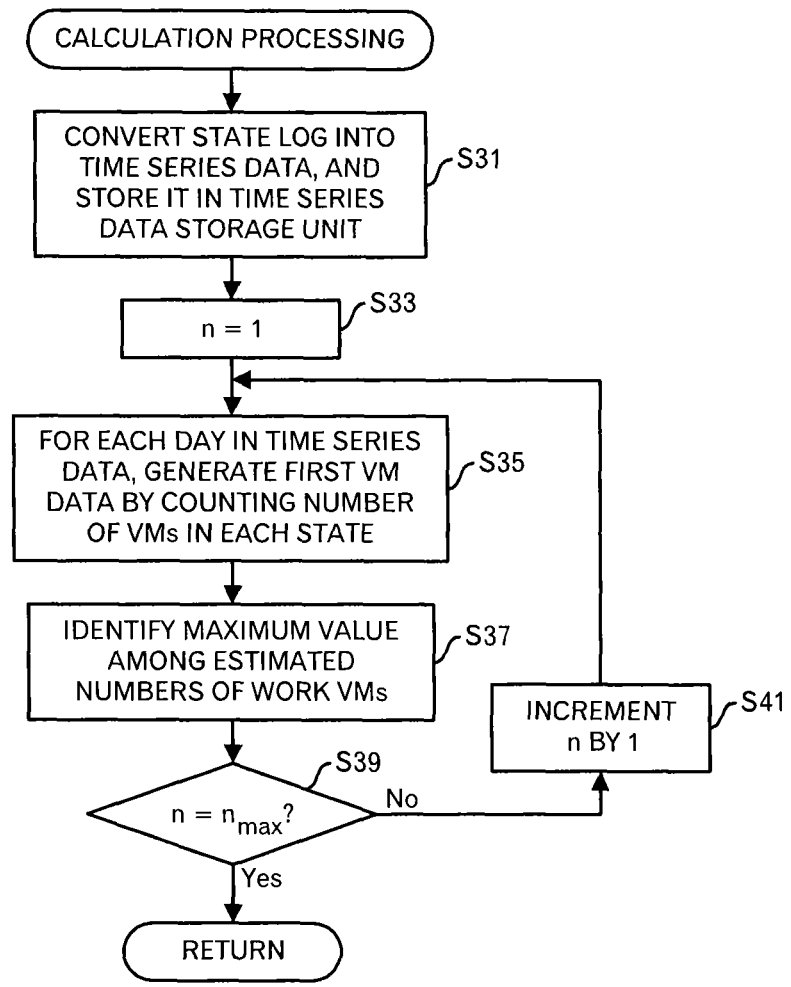
FIG. 12 is a diagram depicting a processing flow of a calculation processing.

Firstly, the calculator 102 converts a state log stored in the state log storage unit 105 into time-series data, and stores the time-series data in the time-series data storage unit 106 (FIG. 12: step S31).

FIG. 13 illustrates an example of time-series data stored in the time-series data storage unit 106. In an example of FIG. 13, a VM name, identification information of a server, and information that represents a state are stored in the time-series data storage unit 106. The information that represents the state is stored for each day in a predetermined period (in the example of FIG. 13, 4 days).

Then the calculator 102 sets a natural number n as 1, which represents the number of days that a VM has been in the idle state (step S33).

The calculator 102 generates, for each day of time-series data stored in the time-series data storage unit 106, first VM data by counting the number of VMs in each state (step S35) and stores the first VM data in the first VM data storage unit 107.

FIG. 14 illustrates an example of the first VM data stored in the first VM data storage unit 107. In an example of FIG. 14, for each day in 4 days from September 29 to October 2, the number of VMs which have been in the idle state for 1 day, the number of VMs which have been in the idle state for 2 days, the number of VMs which have been in the idle state for 3 days or more, and the estimated number of operating VMs in the server 5 for idle VMs in a case where a migration of VMs, which have been in the idle state for 3 days or more, to the server 5 for idle VMs is performed are stored in the first VM data storage unit 107. The example of FIG. 14 is an example in the case of n=2. For example, in the case of n=3, the number of VMs which have been in the idle state for 1 day, the number of VMs which have been in the idle state for 2 days, the number of VMs which have been in the idle state for 3 days, the number of VMs which have been in the idle state for 4 days or more, and the estimated number of operating VMs in the server 5 for idle VMs in a case where a migration of VMs, which have been in the idle state for 4 days or more, to the server 5 for idle VMs is performed are stored in the first VM data storage unit 107. A program to generate, from time-series data on a spreadsheet, first VM data on the same spreadsheet is, for example, a program illustrated in FIG. 15.

Then, the calculator 102 identifies the maximum value among the estimated numbers of operating VMs from the first VM data generated at the step S35 (step S37), and stores the maximum value in the second VM data storage unit 111. The maximum number is "2" when the first VM data is, for example, data illustrated in FIG. 14.

The calculator 102 determines whether $n=n_{max}$ holds (step S39). $n_{max}$ is a natural number set by an administrator or the like in advance. For example, $n_{max}$ is "7". When it is determined that $n=n_{max}$ does not hold (step S39: No route), the calculator 102 increments n by "1" (step S41). Then, the processing returns to the processing of the step S35. On the other hand, when it is determined that $n=n_{max}$ holds (step S39: Yes route), the processing returns to the calling-source processing.

By executing the processings described above, data as illustrated in FIG. 16 is stored in the second VM data storage unit 111. In an example of FIG. 16, a value of n and the maximum value among the estimated numbers of operating VMs on the server 5 for idle VMs in a case where a migration of VMs which have been in the idle state for n days or more to the server 5 for idle VMs is performed are stored in the second VM data storage unit 111.

Here, an explanation of the calculation processing is added. FIGS. 17 to 24 illustrate changes in the number of VMs which migrate to the server 5 for idle VMs, the number of operating VMs on the server 5 for idle VMs, and the number of VMs on the server 5 for idle VMs in the case of n=7. Here, an example in which migrations of VMs start on Sep. 29, 2013, and continue until Oct. 6, 2013 is illustrated.

Figure 17:
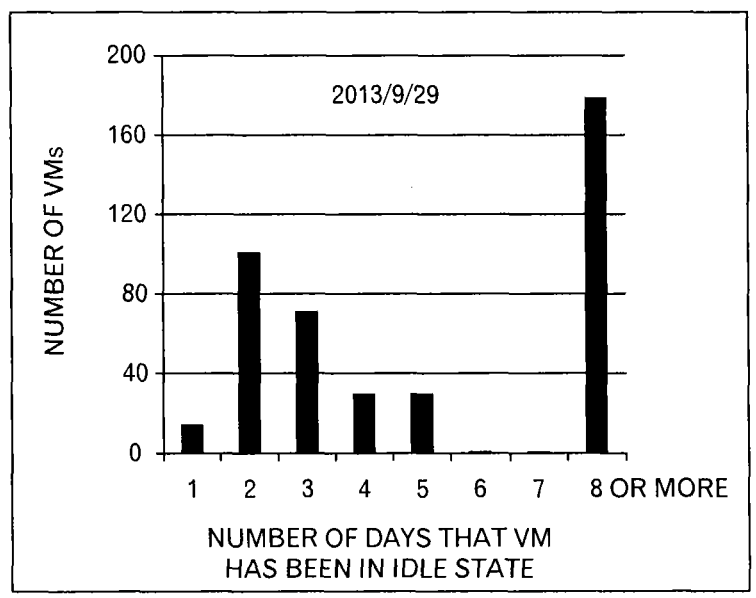
FIG. 17 is a diagram to explain changes in the number of idle VMs.

FIG. 17 illustrates a state of Sep. 29, 2013, which is the first day. On the first day, VMs which have been in the idle state for 7 days and VMs which have been in the idle state for 8 days or more are migrated to the server 5 for idle VMs. Therefore, the number of VMs on the server 5 for idle VMs comes to 177. In this stage, assume that there are no operating VMs on the server 5 for idle VMs.

Figure 18:
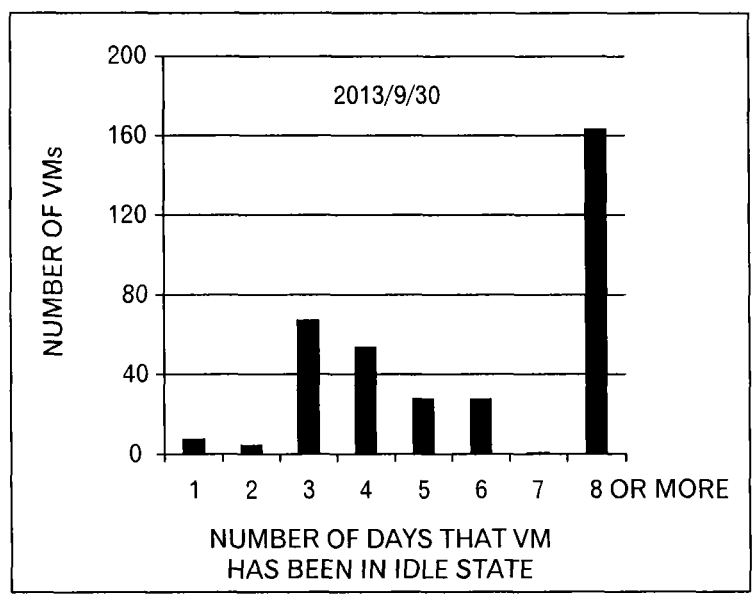
FIG. 18 is a diagram to explain changes in the number of idle VMs.

FIG. 18 illustrates a state of Sep. 30, 2013. On Sep. 30, 2013, the number of VMs which have been in the idle state for 7 days is 1, and the number of VMs, which have started their operation on the server 5 for idle VMs and changed into operating VMs, is 17. The former VM is migrated to the server 5 for idle VMs, and the latter VMs are migrated to one of the application servers 30 to 32. Therefore, the number of VMs on the server 5 for idle VMs is 161 (=177+1−17).

Figure 19:
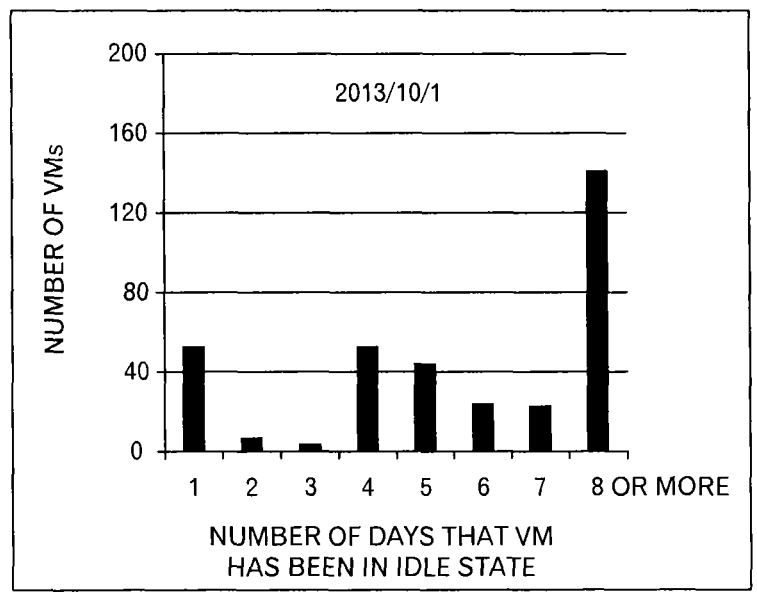
FIG. 19 is a diagram to explain changes in the number of idle VMs.

FIG. 19 illustrates a state of Oct. 1, 2013. On Oct. 1, 2013, the number of VMs which have been in the idle state for 7 days is 23, and the number of VMs, which have started their operation on the server 5 for idle VMs and changed into operating VMs, is 22. The former VMs are migrated to the server 5 for idle VMs, and the latter VMs are migrated to one of the application servers 30 to 32. Therefore, the number of VMs on the server 5 for idle VMs is 162 (=161+23−22).

Figure 20:
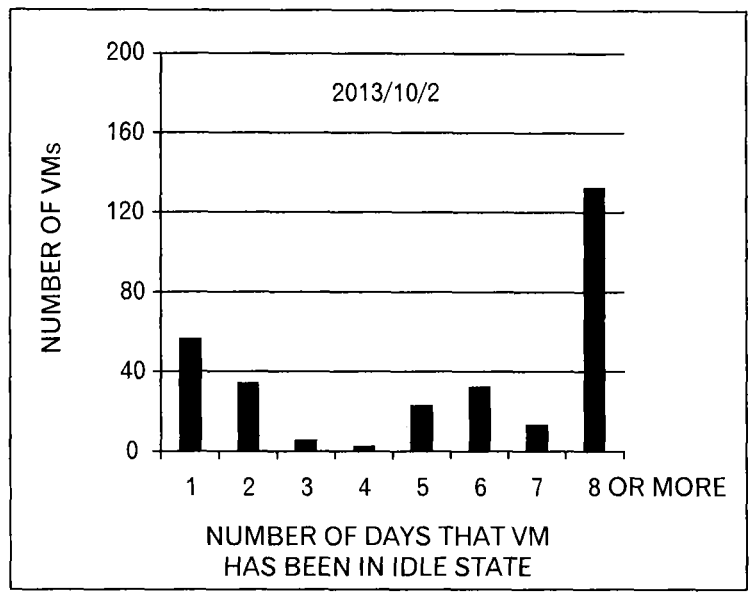
FIG. 20 is a diagram to explain changes in the number of idle VMs.

FIG. 20 illustrates a state of Oct. 2, 2013. On Oct. 2, 2013, the number of VMs which have been in the idle state for 7 days is 13, and the number of VMs, which have started their operation on the server 5 for idle VMs and changed into operating VMs, is 31. The former VMs are migrated to the server 5 for idle VMs, and the latter VMs are migrated to one of the application servers 30 to 32. Therefore, the number of VMs on the server 5 for idle VMs is 144 (=162+13−31).

Figure 21:
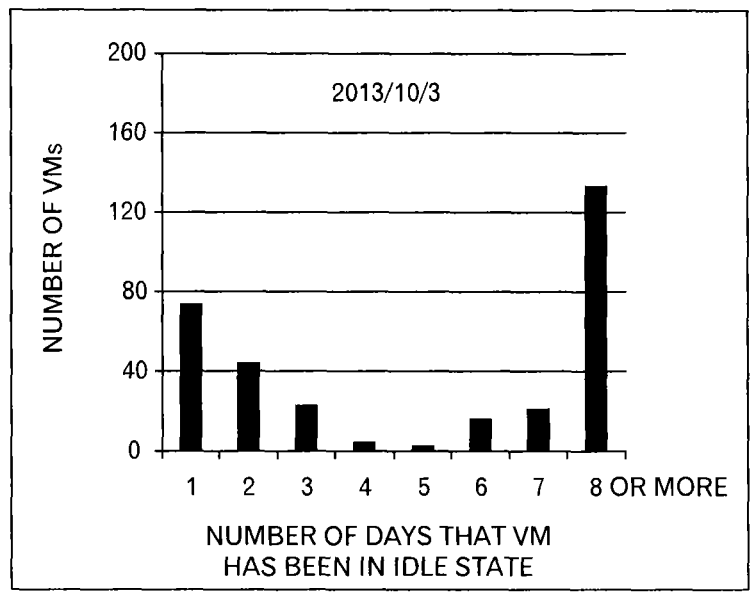
FIG. 21 is a diagram to explain changes in the number of idle VMs.

FIG. 21 illustrates a state of Oct. 3, 2013. On Oct. 3, 2013, the number of VMs which have been in the idle sate for 7 days is 21, and the number of VMs, which have started their operation on the server 5 for idle VMs and changed into operating VMs, is 12. The former VMs are migrated to the server 5 for idle VMs, and the latter VMs are migrated to one of the application servers 30 to 32. Therefore, the number of VMs on the server 5 for idle VMs is 153 (=144+21−12).

Figure 22:
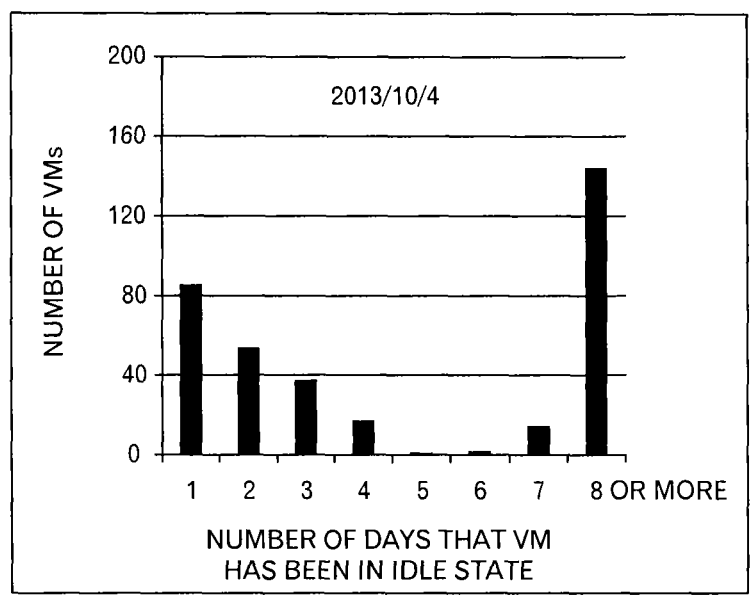
FIG. 22 is a diagram to explain changes in the number of idle VMs.

FIG. 22 illustrates a state of Oct. 4, 2013. On Oct. 4, 2013, the number of VMs which have been in the idle state for 7 days is 14, and the number of VMs, which have started their operation on the server 5 for idle VMs and changed into operating VMs, is 11. The former VMs are migrated to the server 5 for idle VMs, and the latter VMs are migrated to one of the application servers 30 to 32. Therefore, the number of VMs on the server 5 for idle VMs is 156 (=153+14−11).

Figure 23:
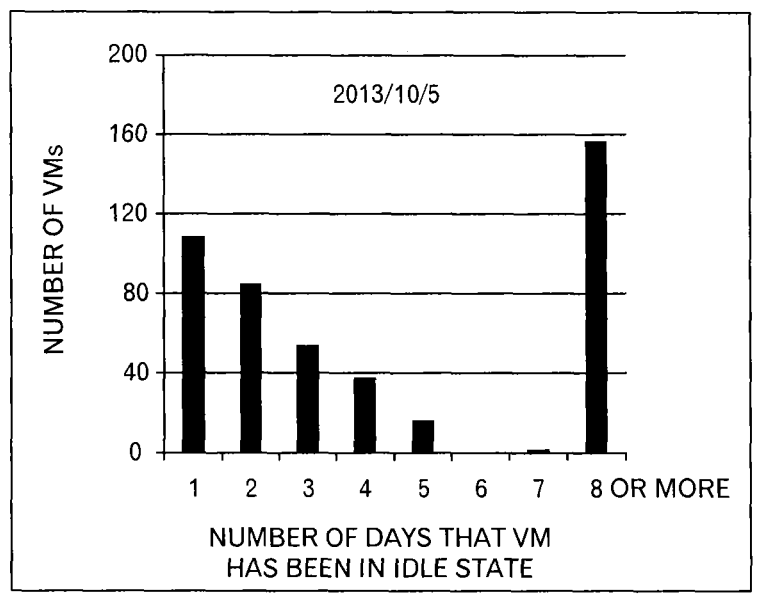
FIG. 23 is a diagram to explain changes in the number of idle VMs.

FIG. 23 illustrates a state of Oct. 5, 2013. On Oct. 5, 2013, the number of VMs which have been in the idle state for 7 days is 2, and the number of VMs, which have started their operation on the server 5 for idle VMs and changed into operating VMs, is 2. The former VMs are migrated to the server 5 for idle VMs, and the latter VMs are migrated to one of the application servers 30 to 32. Therefore, the number of VMs on the server 5 for idle VMs is 156 (=156+2−2).

Figure 24:
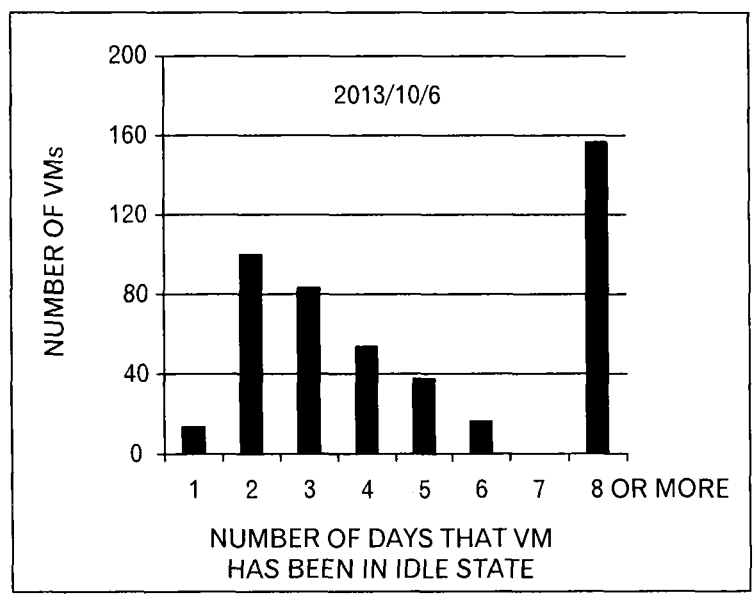
FIG. 24 is a diagram to explain changes in the number of idle VMs.

FIG. 24 illustrates a state of Oct. 6, 2013. On Oct. 6, 2013, the number of VMs which have been in the idle state for 7 days is 0, and the number of VMs, which have started their operation on the server 5 for idle VMs and changed into operating VMs, is 1. The VMs that started their operation on the server 5 for idle VMs are migrated to one of the application servers 30 to 32. Therefore, the number of VMs on the server 5 for idle VMs is 155 (=156+0−1).

Therefore, the maximum number of operating VMs on the server 5 for idle VMs is 31 in the examples illustrated in FIGS. 17 to 24. The maximum number is used for a detection processing.

Returning to the explanation of FIG. 5, the controller 100 outputs a request for execution of the detection processing to the detector 103. In response to this, the detector 103 executes the detection processing (step S7). The detection processing is explained by using FIGS. 25 and 26.

Figures 25, 27:
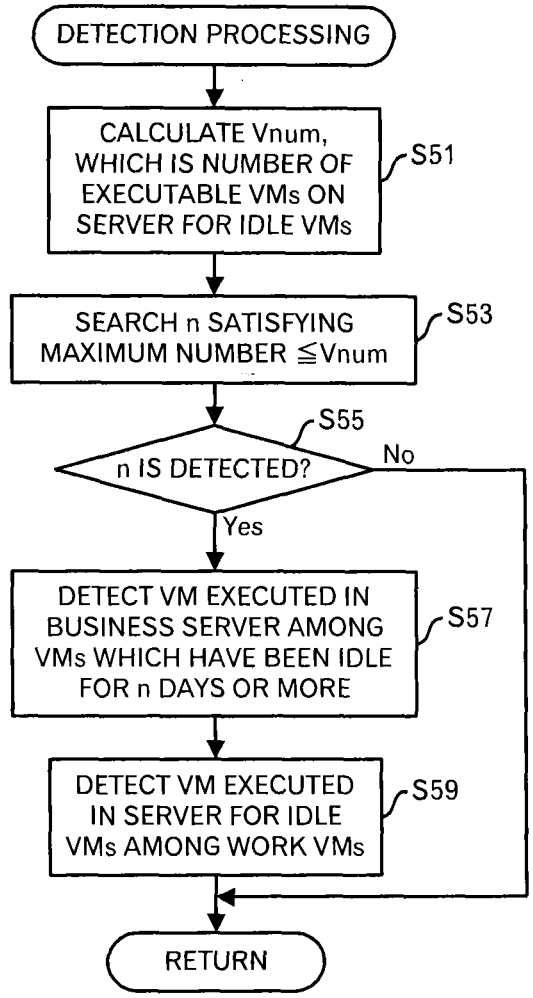
FIG. 25 is a diagram depicting a processing flow of a detection processing.
FIG. 27 is a diagram depicting an example of a script.

Firstly, the detector 103 calculates Vnum that is the number of VMs that the server 5 for idle VMs can execute (FIG. 25: step S51). At the step S51, Vnum is calculated by, for example, Vnum=(memory capacity of the server 5 for idle VMs)/(a memory amount allocated to one VM)*R. The memory amount allocated to one VM is calculated, for example, by dividing a measured value of a total memory amount allocated to VMs in the whole system by the number of VMs. R is a value that represents how much memory overcommit caused by operating VMs on the server 5 for idle VMs is allowed. For example, R=1.5 means that allocating a memory amount 1.5 times as much as memory capacity of the server 5 for idle VMs is allowed.

FIG. 26 illustrates changes in the number of idle VMs in the system. Here, for each day, the number of VMs in the idle state is illustrated for each number of days that VMs are in the idle state. For example, on Sep. 29, 2013, the number of VMs which have been in the idle state for 7 days or more is the largest, and the number of VMs which have been in the idle state for six days is the least. In a time period illustrated in FIG. 26, Oct. 2, 2013 is a date in which the number of VMs, which have started their operation on the server 5 for idle VMs and changed into operating VMs, is the greatest as illustrated in FIGS. 17 to 24. The number of operating VMs is 31 on this date. Therefore, when a memory amount per one VM is 4 GB and R=1.5, memory capacity of the server 5 for idle VMs is approximately 83 GB (≈4*31/1.5). Namely, a physical server whose memory capacity is 83 GB or more may be used.

The detector 103 searches for n that satisfies (the maximum number of VMs≤Vnum) in the second VM data storage unit 111 (step S53).

The detector 103 determines whether n that satisfies (the maximum number of VMs Vnum) has been detected at the step S53 (step S55). When it is determined that n has not been detected (step S55: No route), the processing returns to the calling-source processing because VMs are not migrated.

On the other hand, when it is determined that n has been detected (step S55: Yes route), the detector 103 detects, from the time-series data storage unit 106, VMs executed on one of the application servers 30 to 32 among VMs which have been in the idle state for n (here, the detected n) days or more (step S57).

The detector 103 detects, from the time-series data storage unit 106, VMs executed on the server 5 for idle VMs among operating VMs (step S59). Then, the processing ends.

By performing processings described above, it is possible to prevent performance of the transaction executed by operating VMs on the server 5 for idle VMs from degrading severely and to migrate idle VMs to the server 5 for idle VMs.

For example, the detector 103 may display a value of the detected n on a display device or the like of the allocation management apparatus 1. Thus, an operator of the allocation management apparatus 1 can check the value of n and select a physical server whose memory capacity is proper as the server 5 for idle VMs.

Returning to the explanation of FIG. 5, the detector 103 determines whether VMs have been detected at the step S57 or the step S59 (step S9). When it is determined that the VMs have not been detected (step S9: No route), the processing returns to the processing of the step S1 because there is no VM to be migrated. Furthermore, when the processing of the step S57 and step S59 was not performed, the processing returns to the processing of the step S1 because there is no VM to be migrated.

On the other hand, when it is determined that the VMs have been detected at the step S57 or step S59 (step S9: Yes route), the detector 103 generates a script to migrate the detected VMs (step S11), and stores the script in the script storage unit 108. Then, the processing returns to the processing of the step S1.

FIG. 27 illustrates an example of the script generated at the step S11. A code in the first line is a code to write information that represents a migration of VMs is performed into a system log. A code in the second line is a code to migrate "Web1", which is an idle VM, to "G01" which is the server 5 for idle VMs. A code in the third line is a code to migrate "Web6", which is an operating VM, to "B03" which is an application server. A code in the fourth line is a code to write information that represents the migration of the VMs is completed into the system log.

Figures 28, 29, 30:
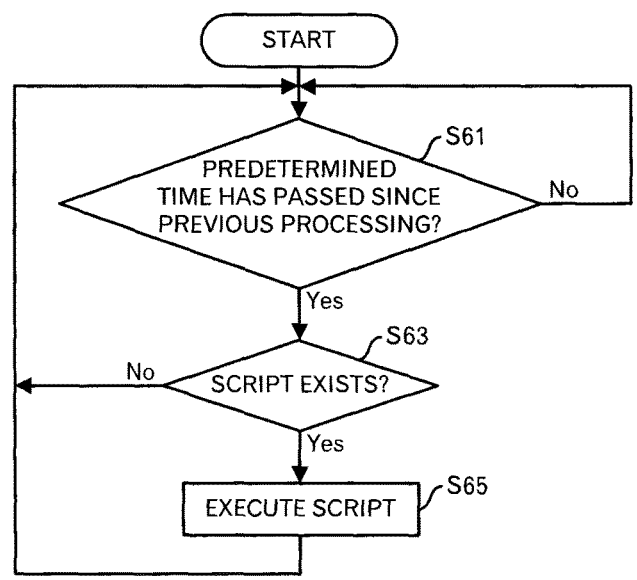
FIG. 28 is a diagram depicting an available memory amount.
FIG. 29 is a diagram depicting an available memory amount.
FIG. 30 is a diagram depicting a processing flow of a processing executed by a script execution unit.

Assume that an application server that is a destination of a migration is, for example, an application server whose available memory amount is the largest. For example, as illustrated in FIG. 28, assume that an available memory amount of the application server "B01" is 20 GB, an available memory amount of the application server "B02" is 15 GB, and an available memory amount of the application server "B03" is 22 GB. In this case, the application server "B03" is selected as an application server that is the destination of the migration.

Then, assume that available memory capacity of each application server comes to a state illustrated in FIG. 29 as a result of the migration of VMs. Specifically, available memory capacity of the application server "B01" is 20 GB, available memory capacity of the application server "B02" is 15 GB, and available memory capacity of the application server "B03" is 18 GB. In this case, an application server that will be selected next as the destination of the migration is the application server "B01".

When the processing returns to the processing of the step S1, the controller 100 deletes the time-series data stored in the time-series data storage unit 106, the first VM data stored in the first VM data storage unit 107, the script stored in the script storage unit 108, the thresholds stored in the threshold storage unit 110, and the second VM data stored in the second VM data storage unit 111.

It is possible to reduce the number of operating physical servers even when collecting up VMs simply based on CPU utilization or the like. However, there's a case where memory overcommit occurs and performance of the transaction degrades due to memory consumption by idle VMs. Namely, a state in which an available memory amount is not enough although CPU utilization is low occurs in an application server. However, in this embodiment, since a script for allocating an idle VM and an operating VM on different servers is generated, it is possible to allocate so as to suppress performance degradation of the transaction.

Next, by using FIG. 30, a processing executed by the script execution unit 104 is explained. First, the script execution unit 104 determines whether a predetermined time (for example, 24 hours) has passed since a previous processing (FIG. 30: step S61). When it is determined that the predetermined time has not passed (step S61: No route), the processing returns to the processing of the step S61. When it is determined that the predetermined time has passed (step S61: Yes route), the script execution unit 104 determines whether a script exists in the script storage unit 108 (step S63).

When it is determined that the script does not exist (step S63: No route), the processing returns to the processing of the step S61. On the other hand, when it is determined that the script exists (step S63: Yes route), the script execution unit 104 executes the script stored in the script storage unit 108 (step S65). Then, the processing returns to the processing of the step S61.

An operator of the allocation management apparatus 1 causes a display device (for example, monitors or the like) to display, for example, a window illustrated in FIG. 31, and carries out a setting for execution of a script. For example, it is possible to carry out, in a setting area 3001, a setting for an interval of processings executed by the script execution unit 104. In an example of FIG. 31, the script execution unit 104 executes a processing at 13 o'clock everyday (in other words, the predetermined time at the step S61 is 24 hours). Moreover, it is possible to carry out, in a detailed setting area 3002, detailed settings for items other than the interval of processings. When the operator pushes a button 3003 by clicking a mouse, the settings are completed.

As described above, by migrating VMs that do not execute the transaction to the server 5 for idle VMs, it is possible to suppress performance degradation of the transaction and reduce the number of working physical servers. In other words, it is possible to use resources of physical servers effectively and reduce electricity consumption.

Moreover, because the number of idle VMs executed by an application server becomes less and memory usage of the application server becomes less, it is possible to prevent memory overcommit from occurring in the application server. Moreover, even when operating VMs are collected up to the application server, the memory overcommit hardly occurs.

Incidentally, there's a possibility that the memory overcommit occurs in the server 5 for idle VMs. However, because idle VMs do not execute the transaction and operating VMs are migrated to an application server at a time when the operating VMs are detected, the transaction is hardly affected.

Moreover, once idle VMs are stopped, a reboot is required before the VMs execute the transaction. Therefore, it takes a while to start execution of the transaction. For example, consider that 450 VMs exist and it takes 1 minute to stop and reboot one VM. In this case, a loss of a time (whose length is 450 minutes=7 hours and 30 minutes) occurs when each VM reboots once. However, it is possible to restart the transaction quickly and users of the service are scarcely affected because any idle VMs are not stopped in this embodiment.

Although the embodiment of this invention was explained above, this invention is not limited to those. For example, the functional block configuration of the allocation management apparatus 1 do not always correspond to a program module configuration.

Moreover, the respective formats of the aforementioned tables are mere examples, and may be changed. Furthermore, as for the processing flow, as long as the processing results do not change, the turns of the steps may be exchanged or the steps may be executed in parallel.

Incidentally, although the number of the server 5 for idle VMs is 1 in the aforementioned example, the number of the server 5 for idle VMs may be more than 1.

APPENDIX

In this appendix, matters relating to this embodiment are explained.

(1) A Memory Amount Allocated to VMs.

Figures 32, 33:
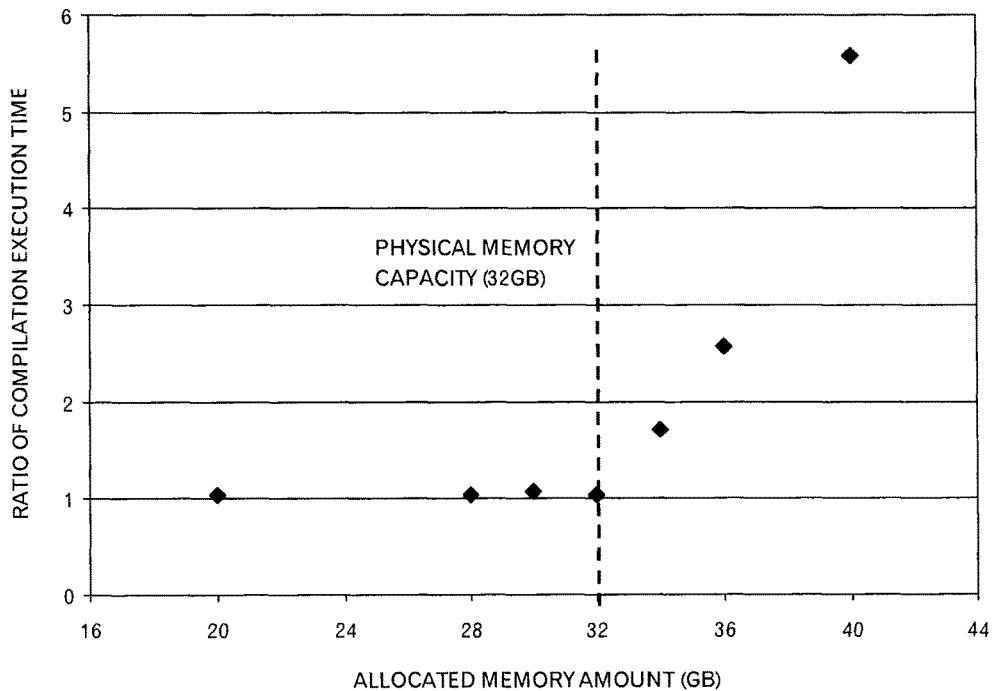
FIG. 32 is a diagram to explain a relationship between a memory amount allocated to VMs and performance.
FIG. 33 is a diagram to explain a relationship between a memory amount allocated to VMs and performance.

When the number of VMs operating on a physical server gradually increases, performance dramatically degrades in a specified timing. This is explained by using a graph of FIG. 32, which is generated from measured data for a specific physical server. In FIG. 32, a horizontal axis represents a memory amount allocated to VMs, and a vertical axis represents a ratio of a compilation execution time. The ratio of the compilation execution time is a ratio of a time for execution of compilation to a time for execution of compilation in an environment in which only VMs for measurement are allocated (here, 536 seconds). The larger the ratio of the compilation execution time is, the worse performance is. Physical memory capacity that a physical server has is 32 GB. As illustrated in FIG. 32, performance scarcely changes when a memory amount allocated to VMs is equal to or less than 32 GB. However, the ratio of the compilation execution time dramatically rises when the memory amount allocated to VMs exceeds 32 GB. The reason is that memory overcommit occurs.

FIG. 33 depicts a diagram to compare a physical server which executes only operating VMs and does not execute idle VMs (hereinafter referred to a physical server A) and a physical server which executes both operating VMs and idle VMs (hereinafter referred to as a physical server B). Both physical servers include a memory whose capacity is 32 GB. The physical server A executes 12 operating VMs, and a memory amount allocated to the VMs is 24 GB. On the other hand, the physical server B executes 12 operating VMs and 20 idle VMs, and a memory amount allocated to the VMs is 64 GB. Here, the memory amount allocated to the VMs is larger than the memory capacity of the physical server B, and memory overcommit occurs. Then, although there is little difference in CPU utilization between the physical server A and the physical server B, an average response time (here, a time required for processings of 6 screens) of the physical server B is 1.5 times as much as that of the physical server A. As described here, performance of processings degrades due to memory overcommit.

(2) CPU Utilization in a Data Center.

Figure 34:
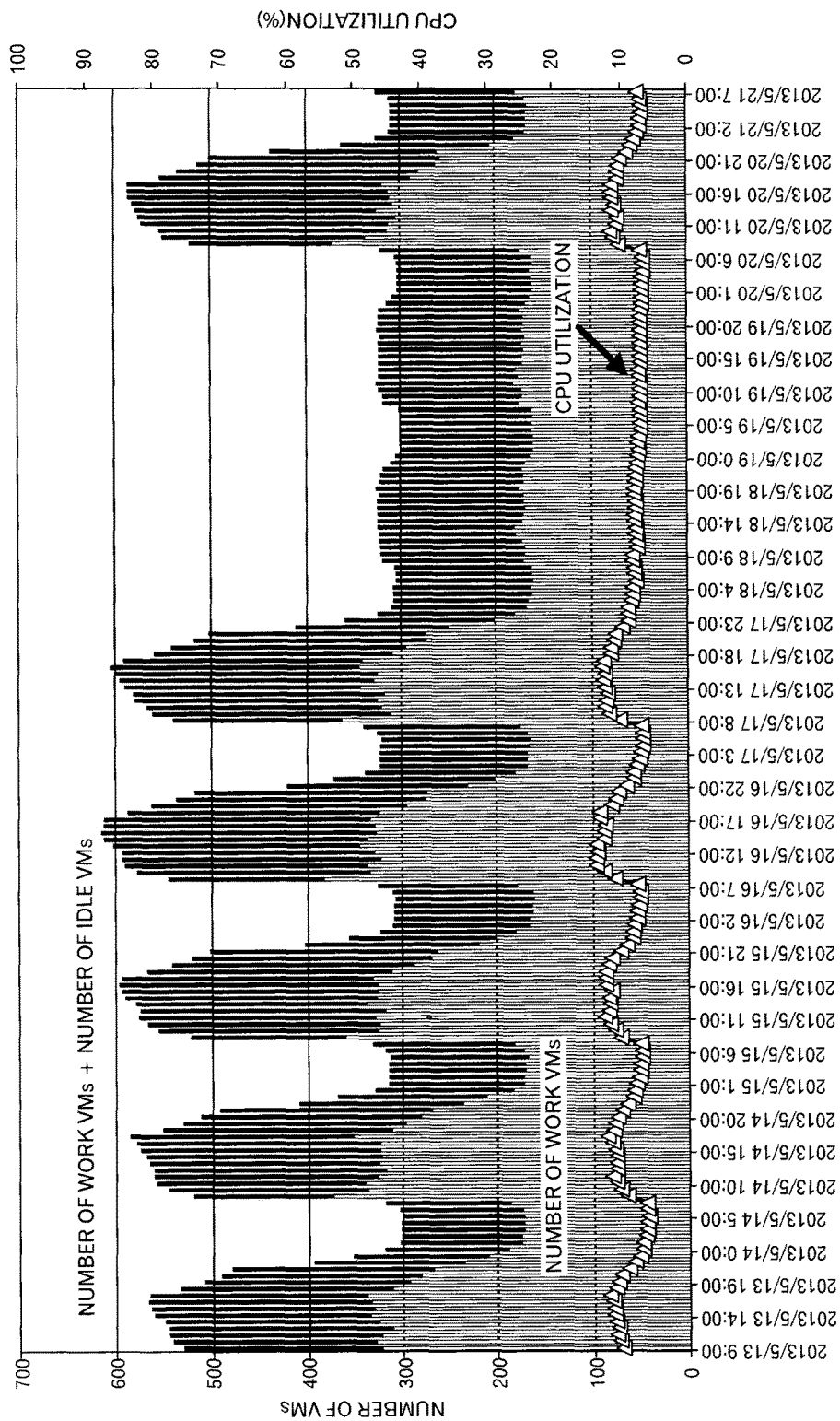
FIG. 34 is a diagram depicting changes in the number of VMs and CPU utilization.

It is pointed out that there are many idle VMs in a data center and resources of physical servers are not used effectively. This is explained by using a graph of FIG. 34, which is generated from measured data in a data center. In FIG. 34, a horizontal axis represents time, a vertical axis in the left side represents the number of VMs, and a vertical axis in the right side represents CPU utilization. A white bar represents the number of operating VMs, a black bar represents a sum of the number of operating VMs and the number of idle VMs, and a white triangle represents CPU utilization. As illustrated in FIG. 34, the CPU utilization is often less than 10%, and the CPU utilization rises slightly more than 10% during a time when the number of operating VMs is great. Thus, a CPU of a physical server is not used effectively. Moreover, as illustrated in FIG. 34, the number of VMs in the idle state is always over 100, and a CPU and a memory in a physical server are used by those VMs.

Figure 35:
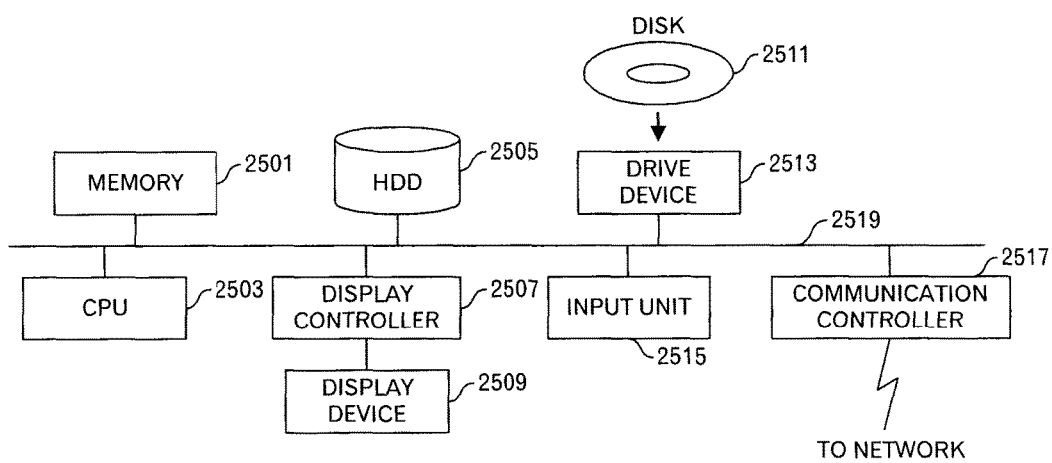
FIG. 35 is a functional block diagram of a computer.

In addition, the aforementioned allocation management apparatus 1, application servers 30 to 32, server 5 for idle VMs, and quality management apparatus 7 are computer devices as illustrated in FIG. 35. That is, a memory 2501 (storage device), a CPU 2503 (processor), a hard disk drive (HDD) 2505, a display controller 2507 connected to a display device 2509, a drive device 2513 for a removable disk 2511, an input unit 2515, and a communication controller 2517 for connection with a network are connected through a bus 2519 as illustrated in FIG. 35. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the application programs systematically cooperate with each other, so that various functions as described above in details are realized.

The aforementioned embodiment is summarized as follows:

An allocation control method relating to a first aspect of this embodiment includes: (A) determining, for each of plural virtual machines executed on a first information processing apparatus or a second information processing apparatus, whether the virtual machine is executing a first processing that is performed in response to a request from an external apparatus; (B) first allocating, to the first information processing apparatus, first virtual machines, which are executing the first processing, among the plural virtual machines; and (C) second allocating, to the second information processing apparatus, second virtual machines, which are not executing the first processing, among the plural virtual machines.

Thus, because the first processing is not affected even when memory overcommit and the like occur in the second information processing apparatus, virtual machines can be gathered in the second information processing apparatus. Therefore, it is possible to reduce the number of information processing apparatuses used for execution of virtual machines and use resources of information processing apparatuses effectively. Moreover, it is possible to suppress performance degradation of the first processing because memory overcommit, which occurs due to virtual machines which do not execute the first processing, can be prevented from occurring in the first information processing apparatus.

Moreover, the determining may include: (a1) obtaining information on a state of a third virtual machine that is allocated to the second information processing apparatus in advance, is not included in the plural virtual machines and does not execute the first processing; and (a2) comparing, for each of the plural virtual machines, information on a state of the virtual machine with the obtained information on the state of the third virtual machine to determine whether the virtual machine is executing the first processing. As described above, because the information on the state of the virtual machine that do not execute the first processing is used, it can be determined, with high accuracy, whether the virtual machine is executing the first processing or not.

Moreover, the second allocating may include: (c1) detecting fourth virtual machines that have not executed the first processing for a first time period or longer in the first information processing apparatus; and (c2) third allocating the fourth virtual machines to the second information processing apparatus. By performing a processing described above, it is possible to prevent memory of the first information processing apparatus from being occupied by virtual machines which do not execute the first processing.

Moreover, (b1, c3) the first allocating and the second allocating may be performed periodically. Thus, it is possible to prevent a processing load from growing large.

Moreover, the allocation control method may further include: (D) first calculating a first number of virtual machines that the second information processing apparatus can execute by using information on memory capacity of the second information processing apparatus and information on an amount of memory allocated to one virtual machine; and (E) second calculating, by using an operational history, the first time period under a condition that a second number of virtual machines does not exceed the first number of virtual machines, wherein the second number of virtual machines is a number of virtual machines that starts to execute the first processing in the second information processing apparatus during a time period from a last execution of the first allocating to a next execution of the first allocating. The shorter the first time period is, the greater the second number of the virtual machines is. Then, performance of the first processing executed in the second information processing apparatus degrades. Therefore, by performing a processing described above, it is possible to suppress performance degradation of the first processing executed in the second information processing apparatus.

Moreover, processing performance of the second information processing apparatus may be lower than processing performance of the first information processing apparatus. It does not matter whether the processing performance of the second information apparatus is high or not, because the first processing is not executed in the second information processing apparatus. Therefore, it is possible to effectively use an information processing apparatus whose processing performance is relatively low.

Moreover, a total amount of memory allocated to the second virtual machines is larger than memory capacity of the second information processing apparatus. Even when memory overcommit occurs, it has no influence on the first processing.

Moreover, the second calculating includes: (e1) third calculating, for each term of plural successive terms, a third number of virtual machines that started to execute the first processing in the term and had not executed the first processing for the first time period or longer before the term; (e2) first identifying a maximum number of virtual machines from among the calculated third numbers of virtual machines; (e3) executing the third calculating and the first identifying plural times while changing the first time period; second identifying, from among the identified maximum numbers, a first maximum number that is equal to or less than the first number of virtual machines; and (e4) third identifying the first time period that corresponds to the identified first maximum number. By performing a processing described above, it is possible to identify the first time period properly.

An allocation control apparatus relating to a second aspect of this embodiment includes circuitry or a processor programmed to determine, for each of plural virtual machines executed on a first information processing apparatus or a second information processing apparatus, whether the virtual machine is executing a first processing that is performed in response to a request from an external apparatus, to allocate, to the first information processing apparatus, first virtual machines, which are executing the first processing, among the plural virtual machines, and to allocate, to the second information processing apparatus, second virtual machines, which are not executing the first processing, among the plural virtual machines.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
   obtaining information on a state of a certain virtual machine that has been deployed on a first information processing apparatus in advance and does not execute a first processing that is performed in response to a request;
   first determining whether a first virtual machine, from among a first plurality of virtual machines executed on the first information processing apparatus, is executing the first processing by comparing information on a state of the first virtual machine with the obtained information on the state of the certain virtual machine;
   second determining whether a second virtual machine, from among a second plurality of virtual machines executed on a second information processing apparatus, is executing the first processing by comparing information on a state of the second virtual machine with the obtained information on the state of the certain virtual machine;
   first migrating, from the second information processing apparatus to the first information processing apparatus, the second virtual machine which is determined not to be executing the first processing; and
   second migrating, from the first information processing apparatus to the second information processing apparatus, the first virtual machine which is determined not to be executing the first processing.

2. The non-transitory computer-readable storage medium as set forth in claim 1, wherein the first migrating comprises:
   determining whether the second virtual machine has not executed the first processing for a first time period or longer in the second information processing apparatus; and
   third migrating the second virtual machine to the first information processing apparatus, upon determining that the second virtual machine has not executed the first processing for the first time period or longer in the second information processing apparatus.

3. The non-transitory computer-readable storage medium as set forth in claim 1, wherein the first migrating and the second migrating are performed periodically.

4. The non-transitory computer-readable storage medium as set forth in claim 3, wherein the process further comprises:
   first calculating a first number of virtual machines that the first information processing apparatus is capable of executing by using information on memory capacity of the first information processing apparatus and information on an amount of memory allocated to one virtual machine; and
   second calculating, by using an operational history, a first time period under a condition that a second number of virtual machines does not exceed the first number of virtual machines, wherein the second number of virtual machines is a number of virtual machines that start to execute the first processing in the first information processing apparatus during a time period from a last execution of the second migrating to a next execution of the second migrating.

5. The non-transitory computer-readable storage medium as set forth in claim 4, wherein the second calculating comprises:
   third calculating, for each term of a plurality of successive terms, a third number of virtual machines that started to execute the first processing in the term and had not executed the first processing for the first time period or longer before the term;
   first identifying a maximum number of virtual machines from among the calculated third numbers of virtual machines;
   executing the third calculating and the first identifying a plurality of times while changing the first time period;
   second identifying, from among the identified maximum number of virtual machines, a first maximum number that is equal to or less than the first number of virtual machines; and
   third identifying the first time period that corresponds to the identified first maximum number.

6. The non-transitory computer-readable storage medium as set forth in claim 1, wherein processing performance of the first information processing apparatus is lower than processing performance of the second information processing apparatus.

7. The non-transitory computer-readable storage medium as set forth in claim 1, wherein a total amount of memory allocated to the first plurality of virtual machines executed on the first information processing apparatus is larger than memory capacity of the first information processing apparatus.

8. An allocation control method, comprising:
   obtaining, by using a computer, information on a state of a certain virtual machine that has been deployed on a first information processing apparatus in advance and does not execute a first processing that is performed in response to a request;
   first determining, by using the computer, whether a first virtual machine, from among a first plurality of virtual machines executed on a first information processing apparatus, is executing the first processing by comparing information on a state of the first virtual machine with the obtained information on the state of the certain virtual machine;
   second determining, by using the computer, whether a second virtual machine, from among a second plurality of virtual machines executed on a second information processing apparatus, is executing the first processing by comparing information on a state of the second virtual machine with the obtained information on the state of the certain virtual machine;
   first migrating, by using the computer and from the second information processing apparatus to the first information processing apparatus, the second virtual machine which is determined to not be executing the first processing; and
   second migrating, by using the computer and from the first information processing apparatus to the second information processing apparatus, the first virtual machine which is determined to be executing the first processing.

9. An allocation control apparatus, comprising:
   a memory; and
   a processor coupled to the memory, the processor being configured to:
     obtain information on a state of a certain virtual machine that has been deployed on a first information processing apparatus in advance and does not execute a first processing that is performed in response to a request;
     first determine whether a first virtual machine, from among a first plurality of virtual machines executed on the first information processing apparatus, is executing a first processing by comparing information on a state of the first virtual machine with the obtained information on the state of the certain virtual machine;
     second determine whether a second virtual machine, from among a second plurality of virtual machines executed on a second information processing apparatus, is executing the first processing by comparing information on a state of the second virtual machine with the obtained information on the state of the certain virtual machine;
     first migrate, from the second information processing apparatus to the first information processing apparatus, the second virtual machine which is determined not to be executing the first processing; and
     second migrate, from the first information processing apparatus to the second information processing apparatus, the first virtual machine which is determined to be executing the first processing.

\* \* \* \* \*